United States Patent [19]
Roth et al.

[11] Patent Number: 4,740,663
[45] Date of Patent: Apr. 26, 1988

[54] TRANSVERSE FLUX INDUCTION HEATING UNIT

[75] Inventors: Donald J. Roth, Westport, Conn.; Glenn R. Mohr, Linthicum, Md.

[73] Assignee: Continental Can Company, Inc., Norwalk, Conn.

[21] Appl. No.: 75

[22] Filed: Jan. 2, 1987

[51] Int. Cl.⁴ .............................................. H05B 6/10
[52] U.S. Cl. ................... 219/10.79; 219/10.53; 219/10.73; 219/10.75; 156/380.2; 156/274.2
[58] Field of Search ............ 219/10.79, 10.57, 10.53, 219/10.43, 10.67, 10.75, 10.71, 10.73, 10.49 R, 10.61 R; 336/219, 217, 216; 156/274.2, 272.4, 380.2, 379.6, 379.7, 380.6

[56] References Cited

U.S. PATENT DOCUMENTS

| | | | |
|---|---|---|---|
| 1,912,214 | 5/1933 | Northrup | 219/10.79 X |
| 3,121,780 | 2/1964 | Mucha et al. | 219/10.43 X |
| 3,303,314 | 2/1967 | Kuhlbars | 219/10.43 |
| 3,467,806 | 9/1969 | Dixon | 219/10.73 |
| 3,766,353 | 10/1973 | Barbieux | 219/10.79 |
| 3,775,722 | 11/1973 | Wentz et al. | 336/219 |
| 4,315,124 | 2/1982 | Granstrom et al. | 219/10.75 X |
| 4,371,768 | 2/1983 | Pozna | 219/10.53 |
| 4,401,486 | 8/1983 | Pusateri et al. | 219/10.43 X |
| 4,590,347 | 5/1986 | Thatcher et al. | 219/10.49 R |
| 4,602,139 | 7/1986 | Hutton et al. | 219/10.53 X |

Primary Examiner—Philip H. Leung
Attorney, Agent, or Firm—Charles E. Brown; Paul Shapiro; Charles A. Brown

[57] ABSTRACT

This relates to an induction heating unit which is particularly constructed for inducing electrical energy into the periphery of a metal foil barrier layer of a closure for a container to thereby heat the closure and heat bond the closure to the container. In lieu of the customary single turn coil, there is provided a multiple turn coil which is mounted in one of two opposing U-sections of a core. The U-sections may either be formed of ferrite or be of a laminated construction. First legs of the U-sections are utilized to clamp a closure to a container while there will be an air gap between the other opposed legs of the U-sections. Heating may be controlled by either varying the air gap or by varying the ratio of electrically conductive members with insulating spacers.

21 Claims, 1 Drawing Sheet

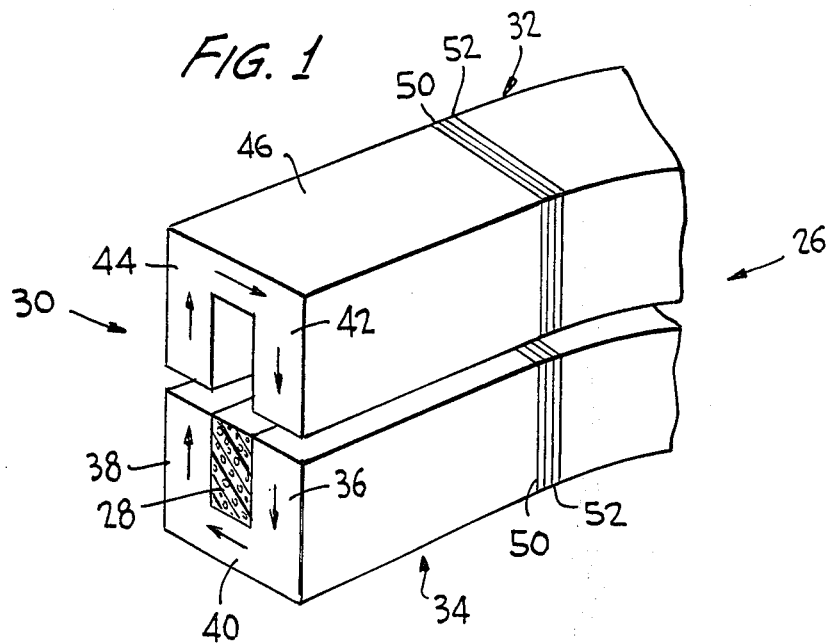
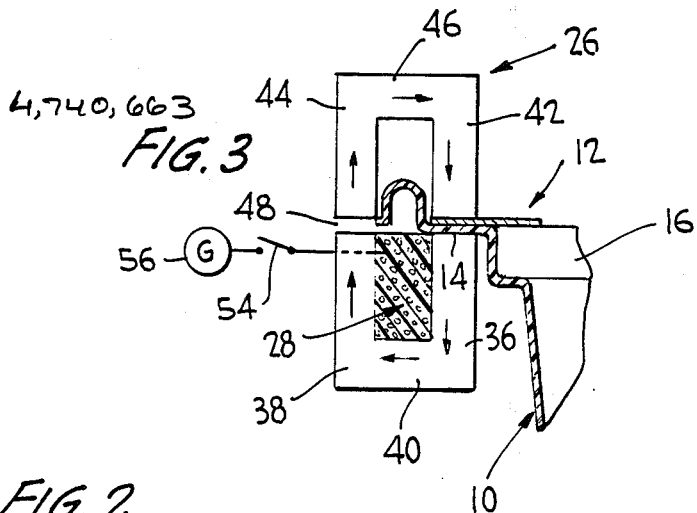
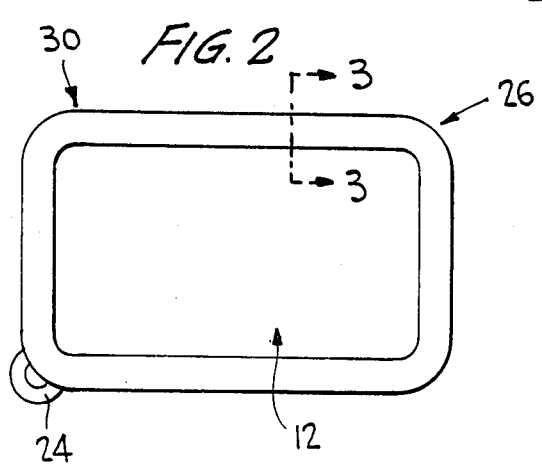

TRANSVERSE FLUX INDUCTION HEATING UNIT

This invention relates in general to new and useful improvements in induction heating units, and more particularly to a transverse flux induction heating unit.

Most particularly, this invention relates to an induction heating unit which is particularly adaptable for instantaneously heating a metal foil layer within a closure for a container so as to effect heat bonding of the closure to the container.

It is known to induction heat a metal foil layer within a closure so as to heat bond the closure to a container utilizing a one turn induction heating coil. The strength of the induction field is determined by the ampere turns per inch. With a single turn induction coil, the amperes required to heat a closure in 0.1 seconds could be 2500 amperes or more. In accordance with this invention, it is proposed to utilize a multiple turn induction heating coil which will have a required number of turns to match the coil to a high frequency current generator. With such an arrangement and by cutting the lid at ninety degrees, a separate matching transformer is eliminated with the resultant circuit being more efficient and machine costs are reduced.

In accordance with this invention, there are provided two U-sections which are arranged in stacked opposed relation with the multiple turn coil being located within one or both of the U-sections. The two stacked U-sections will have inner and outer legs arranged in opposed, generally aligned relation with one pair of legs forming means to clamp the workpiece to be heated and the other pair of legs being spaced apart. The amount of heating along any portion of the heating unit may be varied by varying the spacing between the other pair of legs.

The U-sections, which form the core of the heating unit, can be formed of ferrite or more beneficially, may be of a laminated construction. When the core is of a laminated construction, a plurality of U-shaped members are provided, some of which are formed of electrically conductive magnetic material and others of which are formed of insulating material. By varying the ratio of the conducting members and the insualting members, the amount of heat produced along a selected portion of the heating unit may be varied.

The heating unit is particularly adapted to the heating of a closure which is either of an outline including straight portions and a corner or has a projecting pull tab, or both. Due to the change in distribution of the heating currents induced into the metal foil layer of the closure at the corners, more heat is required at the corners. In addition, in the area of the pull tab, there is more metal foil to be heated with the result that more heat is required in the area of the pull tab. A heating unit as outlined above, may be beneficially adjusted or constructed to provide the desired heat in all areas of the closure whereby a uniform heating pattern may be obtained.

With the above and other objects in view that will hereinafter appear, the nature of the invention will be more clearly understood by reference to the following detailed description, the appended claims, and the several views illustrated in the accompanying drawings.

FIG. 1 is an enlarged fragmentary elevational view with parts broken away of a heating unit formed in accordance with this invention.

FIG. 2 is a plan view of a typical heating unit showing the same in conjunction with a container having a closure which is to be heat bonded to the container.

FIG. 3 is an enlarged fragmentary transverse vertical sectional view taken generally along the line 3—3 of FIG. 2 and shows the relationship of the heating unit with respect to a typical container and closure assembly.

FIG. 4 is an enlarged fragmentary sectional view taken through the closure showing the details thereof.

Referring now to the drawings in detail, reference is first made to FIG. 3 wherein there is illustrated a container 10 to which a closure 12 is to be heat bonded in sealed relationship with respect to the container 10. The container 10 is of a plastic material construction and may preferably be of a laminated construction so as to include a barrier layer. The container 10 is provided with a configuration so as to include a support flange 14 which extends entirely around the cavity 16 of the container. A peripheral portion only of the closure 12 rests on the support flange 14 and it is this peripheral portion of the closure 12 which is to be heat bonded to the container 10 along the support flange 14.

For an understanding of the utilization of the heating unit, a typical sectional view through the closure 12 is found in FIG. 4. It will be seen that the closure 12 is primarily of a plastic material construction and includes an outer structural plastic layer 18 and an inner plastic material bonding layer 20 with there being sandwiched between the layers 18 and 20 a metal foil layer 22. The metal foil layer 22 is preferably in the form of aluminum foil and in a preferred embodiment of the closure, the aluminum foil will have a thickness on the order of 0.0018 inch.

It is to be understood that the aluminum foil layer 22 only in the peripheral area of the closure 12 will be heated to a very high temperature in a very short time, for example, within 0.1 second. This heat will then be conducted to the layer 20 and from the container 10 so as to effect the heat bonding of the layer 20 to the outermost surface of the container 10 along the support flange 14.

As is shown in FIG. 2, the closure 12 will preferably be provided with a pull tab 24 for facilitating the peeling of the closure 12 from the container 10 when it is desired to open the container 10. Inasmuch as the pull tab 24 will be of the same laminated construction as the closure 12, it will be seen that in the area of the pull tab 24, more heating will be required.

Also, as is shown in FIG. 2, the container 10 may be of a rectangular outline or may have at least one corner. The current induced into the aluminum layer, has a tendency to shortcut the corners thereby requiring more heating at the corners. Furthermore, if the pull tab 24 is at one of the corners, then even more heat is required at that corner.

In the past, the closure 12 has been heat bonded to the container 10 utilizing a one turn induction coil with there being pieces of ferrite associated with that coil so as to vary the electrical energy induced into the metal foil layer 22 and thus the heating of the same. This results in a rather complex heating unit. Furthermore, because a single turn induction heating coil will not match the required high frequency generator, a matching transformer has been required. However, by utilizing a multiple turn coil, it has been found that the matching transformer can be eliminated with the circuit being more efficient and the machine cost being reduced.

This invention particularly relates to a heating unit, generally identified by the numeral 26, which utilizes such a multiple turn coil generally identified by the numeral 28.

The heating unit 26 also includes a core, generally identified by the numeral 30. The core 30 is of an outline in accordance with the configuration of the workpiece and in the case of a rectangular container, the core 30 would have the outline illustrated in FIG. 2.

The core 30 is formed of two U-sections 32, 34 which are arranged in opposed relation. The lowermost U-section 34 includes an inner leg 36 and an outer leg 38 joined together by a base 40. In the illustrated form of the invention, the coil 28 is received in the lower U-section 34 and is potted therein. However, the coil may be in either or both of the U-sections 32, 34.

The U-section 32 also includes an inner leg 42, an outer leg 44, and a top wall with each other while the legs 38 and 44 are generally aligned with each other. It is intended that the lid 12 be clamped to the support flange 14 and the container 10 by the legs 36, 42 as is shown in FIG. 3. On the other hand, if the workpiece was of a ring shape, then the workpiece would be clamped together by the legs 38, 44.

With the arrangement shown in FIG. 3, there will be an air gap 48 between the legs 38, 44. This air gap may be varied with the thickness or height of the air gap 48 controlling the heat of the workpiece.

At this time it is pointed out that the core 38 may be of two possible constructions. First of all, the U-sections 32, 34 may be formed of ferrite. Inasmuch as the heat requirements at the corners of the closure 12 and also at the pull tab 24 will vary, then the thickness of the air gap 48 may be utilzed as the sole means of controlling the heating of the aluminum foil layer 22 about the periphery of the closure 12. The air gap 48 is small for maximum heating and large for lesser heating. Thus, with respect to FIG. 2, where the pull tab 24 is located at a corner, the air gap 48 would be a minimum and along the straight sides and ends of the container, the air gap 48 would be a maximum.

Although the U-sections 32, 34 may be formed of ferrite, in a preferred embodiment, they are of a laminated construction. As is schematically shown in FIG. 1, each of the U-sections 32, 34 is made up of a stack of U-shaped members, some of the members being formed of an electrical conductive material and being identified by the numeral 50 with others of the members being formed of an electrically insulated material and being identified by the numeral 52. For example, the members 50 may be stamped from sheet aluminum while the members 52 may be stamped from sheets of suitable plastic material. The members 50, 52 may be retained in alignment in accordance with the configuration of the U-sections 32, 34 in any desired manner. However, it is preferred that the members 50, 52 be mounted within any suitable support material, such as a potting material (not shown).

It is to be understood that when the ratio of the members 50 to the members 52 is relatively high and the members 50 are relatively close together, the spacer members 52 are increased thereby reducing the ratio of the members 50 to the members 52.

It is to be understood that in addition to heat being controlled by the spacing of the members 50, heat can also be controlled by varying the air gap 48. Under the circumstances, along the straight portions of the lid 12, the spacing of the members 50 will be a maximum. At the corners, the number of spacers 52 will be decreased so that the spacing of the members 50 will decrease with the result that there will be greater heating as required at the corners. Finally, at the corner where the pull tab 24 is located, the ratio of the members 50 to the members 52 will be greatly increased to provide for the added heat requirement.

Finally, with respect to FIG. 3, it will be seen that the multiple turn coil 28 will be connected by means of a suitable switch 54 to a high frequency generator 56. As pointed out above, the number of windings of the multiple turn coil 28 will be such as to match the generator 56 thereby eliminating the requirement for the presently required matching transformer. Therefore, with the exception of the switch 54, the coil 28 may be directly connected to the generator 56.

Because the lines of flux through the U-sections 32, 34 cut the closure 12 at ninety degrees, maximum efficiency can be obtained. This, combined with the elimination of the matching transformer, provides for a more efficient operation and a reduction in machine costs.

Although only two preferred embodiments of the heating unit have been specifically illustrated and described herein, it is to be understood that minor variations may be made in the heating unit without departing from the spirit and scope of the invention as defined by the appended claims.

I claim:

1. A transverse flux induction heating unit, said heating unit comprising a core in the form of two opposed U-sections formed at least in part of an electrically conductive material, each of said U-sections being of an outline in plan having a configuration in accordance with an area outline to be heated, each of said U-sections having an inner leg and an outer leg, said inner legs being in opposed generally aligned relation and said outer legs being in opposed generally aligned relation, one pair of said legs forming means for clamping a workpiece for inducing electrical energy into such workpiece, and a plural turn induction coil within one of said U-sections, said coil having means for coupling to a source of high frequency electrical current.

2. A heating unit according to claim 1 wherein there is a high frequency generator, and said coil is matched to said generator to eliminate a matching transformer.

3. A heating unit according to claim 1 wherein there is an air gap between a second pair of said legs, said air gap being a size in accordance with desired heating.

4. A heating unit according to claim 3 wherein said core is of a configuration which includes at least one corner, and said gap is smaller at said corner.

5. A heating unit according to claim 4 wherein each of said U-sections is formedof ferrite.

6. A heating unit according to claim 3 wherein said heating unit is particularly adapted for heat bonding a closure to a container with said closure having a pull tab, and said gap being lesser in that portion of said core intended to be aligned with a pull tab to provide more heat at such pull tab.

7. A heating unit according to claim 6 wherein each of said U-sections is formed of ferrite.

8. A heating unit according to claim 3 wherein said heating unit is particularly adapted for heat bonding a closure to a container wherein a desired heat pattern includes straight portions and corners and such closure has a projecting pull tab at one of said corners, said gap being lesser at the corners than along the straight portions and being still lesser in alignment with the one corner.

9. A heating unit according to claim 8 wherein each of said U-sections is formed of ferrite.

10. A heating unit according to claim 3 wherein each of said U-sections is formed of ferrite.

11. A heating unit in accordance with claim 1 wherein each of said U-sections is of a laminated construction in a longitudinal direction.

12. A heating unit according to claim 11 wherein there is an air gap between a second pair of legs, said air gap being a size in accordance with desired heating.

13. A heating unit in accordance with claim 1 wherein each of said U-sections is of a laminated construction in a longitudinal direction including electrically conductive elements and insulating elements each of a U-shaped outline.

14. A heating unit according to claim 13 wherein a ratio of electrically conductive elements to insulating elements is varied along the extent of each of said U-sections to vary heat produced by said heating unit in different portions of said U-sections.

15. A heating unit according to claim 14 wherein said core is of a configuration which includes at least one corner, and said ratio is higher at said corner to provide greater heat at said corner.

16. A heating unit according to claim 15 wherein said heating unit is particularly adapted for heat bonding a closure to a container wherein a desired heat pattern includes straight portions and corners and such closure has a projecting pull tab at a selected one of said corners, said ratio being greater at the corners than along the straight portions and being still greater in alignment with the selected one corner.

17. A heating unit according to claim 14 wherein said heating unit is particularly adapted for heat bonding a closure to a container with said closure having a pull tab, and said ratio being greater in that portion of said core intended to be aligned with a pull tab to provide more heat at such pull tab.

18. A heating unit according to claim 13 wherein there is an air gap between a second pair of legs, said air gap being a size in accordance with desired heating.

19. A heating unit according to claim 1 wherein said induction coil is only in one of said U-sections, the other of said U-sections being open.

20. A heating unit according to claim 1 wherein said induction coil is only in one of said U-sections, the other of said U-sections being open to receive a projecting portion of a workpiece being heated.

21. A heating unit according to claim 1 wherein said induction coil fills said one U-section.

* * * * *